(12) United States Patent
Bland et al.

(10) Patent No.: US 6,684,615 B1
(45) Date of Patent: Feb. 3, 2004

(54) HINGE SYSTEM FOR ARTICULATING MOWER DECKS

(75) Inventors: Mark Bland, New Albany, IN (US); Edward E. Foxworthy, Indianapolis, IN (US); Burl W. Tichenor, Franklin, IN (US)

(73) Assignee: LasTec, Inc., Lizton, IN (US)

( * ) Notice: Subject to any disclaimer, the term of this patent is extended or adjusted under 35 U.S.C. 154(b) by 0 days.

(21) Appl. No.: 10/200,838

(22) Filed: Jul. 19, 2002

(51) Int. Cl.$^7$ .............................................. A01D 34/64
(52) U.S. Cl. ........................................................ 56/15.6
(58) Field of Search ....................... 56/1, 6, 10.1, 11.6, 56/13.5, 13.6, 14.9, 15.2, 15.6, 15.8, 17.5, 320.1, 320.2, DIG. 9, DIG. 22

(56) References Cited

U.S. PATENT DOCUMENTS

| | | | |
|---|---|---|---|
| 5,280,695 A | * | 1/1994 | Nunes et al. ..................... 56/6 |
| 5,483,787 A | * | 1/1996 | Berrios ........................ 56/10.1 |
| 5,553,445 A | * | 9/1996 | Lamb et al. ..................... 56/7 |
| 6,000,202 A | | 12/1999 | Laskowski |
| 6,065,274 A | | 5/2000 | Laskowski |
| 6,205,754 B1 | | 3/2001 | Laskowski |
| 6,347,503 B1 | * | 2/2002 | Esau et al. ................... 56/15.9 |

* cited by examiner

*Primary Examiner*—Robert E. Pezzuto
(74) *Attorney, Agent, or Firm*—Woodard, Emhardt, Moriarty, McNett & Henry LLP (57) ABSTRACT

A hinge assembly hingedly connects a first mower frame member defining a first frame hole to a second mower frame member defining a second frame hole, wherein at least one of the first and second frame members is a frame member of a mower deck of the mower. The hinge assembly comprises a first bushing having a first bushing hole and a first bushing axis, being sized for press fit receipt in the first frame hole, and being sized to rotatably coaxially receive a pin therein; a second bushing having a second bushing hole and a second bushing axis, being sized for axially non-rotating receipt in the second frame hole, and being sized to rotatably coaxially receive a pin therein; a pin having inboard and outboard ends and a pin axis, the pin sized to extend coaxially through the first and second bushing holes; a connector connected to the outboard end of the pin and for connecting the pin to the second frame member and holding the pin against horizontal movement relative to the second frame member and for providing a stop for limiting movement of the second bushing toward the outboard end of the pin; and, a retention member connected proximal to the inboard end of the pin and limiting movement of the bushings inwardly of the retention member.

46 Claims, 4 Drawing Sheets

HINGE SYSTEM FOR ARTICULATING MOWER DECKS

FIELD OF THE INVENTION

The present invention relates to the field of lawn mowers, and more particularly, to hinge systems for interconnecting articulating lawn mower decks.

BACKGROUND OF THE INVENTION

To decrease the amount of time needed for cutting large areas of grass, mowers with multiple blades providing greatly increased cutting widths were designed. But because the world of grass is not flat, the cut was usually uneven and patches of grass were often scalped. Mounting the blades in individual mower decks and articulating the decks—that is, hingedly connecting the decks to one another—permitted the multiple deck mower to more closely follow the contour of the grass being cut. Over time, and especially in commercial applications of such articulating deck mowers, such as on golf courses, the constant articulation caused the hinge pins connecting adjacent decks to wear down. Replacement of the pins can be a time consuming, multi-step process, requiring the decks to be disassembled.

What is needed is a hinge system that resists wear and facilitates servicing and replacement.

SUMMARY OF THE INVENTION

Generally speaking, a hinge system is provided that resists wear and facilitates servicing and replacement. The hinge system include a front and a rear hinge assembly that hingedly connects a first mower deck to a second mower deck or a first mower deck to a portion of the mower that is not a mower deck.

A hinge assembly hingedly connects a first mower frame member defining a first frame hole to a second mower frame member defining a second frame hole, wherein at least one of the first and second frame members is a frame member of a mower deck of the mower. The hinge assembly comprises a first bushing having a first bushing hole and a first bushing axis, being sized for press fit receipt in the first frame hole, and being sized to rotatably coaxially receive a pin therein; a second bushing having a second bushing hole and a second bushing axis, being sized for axially non-rotating receipt in the second frame hole, and being sized to rotatably coaxially receive a pin therein; a pin having inboard and outboard ends and a pin axis, the pin sized to extend coaxially through the first and second bushing holes; a connector connected to the outboard end of the pin and for connecting the pin to the second frame member and holding the pin against horizontal movement relative to the second frame member and for providing a stop for limiting movement of the second bushing toward the outboard end of the pin; and, a retention member connected proximal to the inboard end of the pin and limiting movement of the bushings inwardly of the retention member.

It is an object of the present invention to provide an improved hinge system for articulating mower decks.

Further objects and advantages will become apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Figure 1:
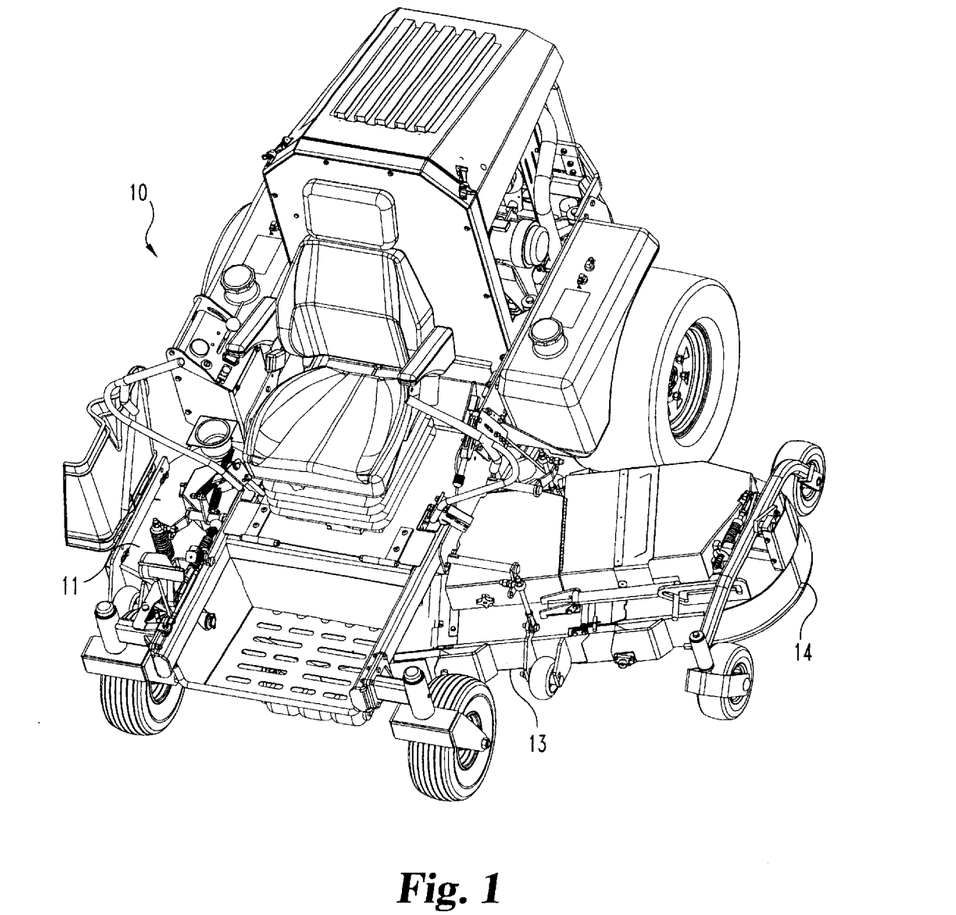
FIG. 1 is a front, perspective view of a lawn mower 10 incorporating a hinge system for hingedly connecting the articulating mower decks in accordance with the present invention.
Figure 2:
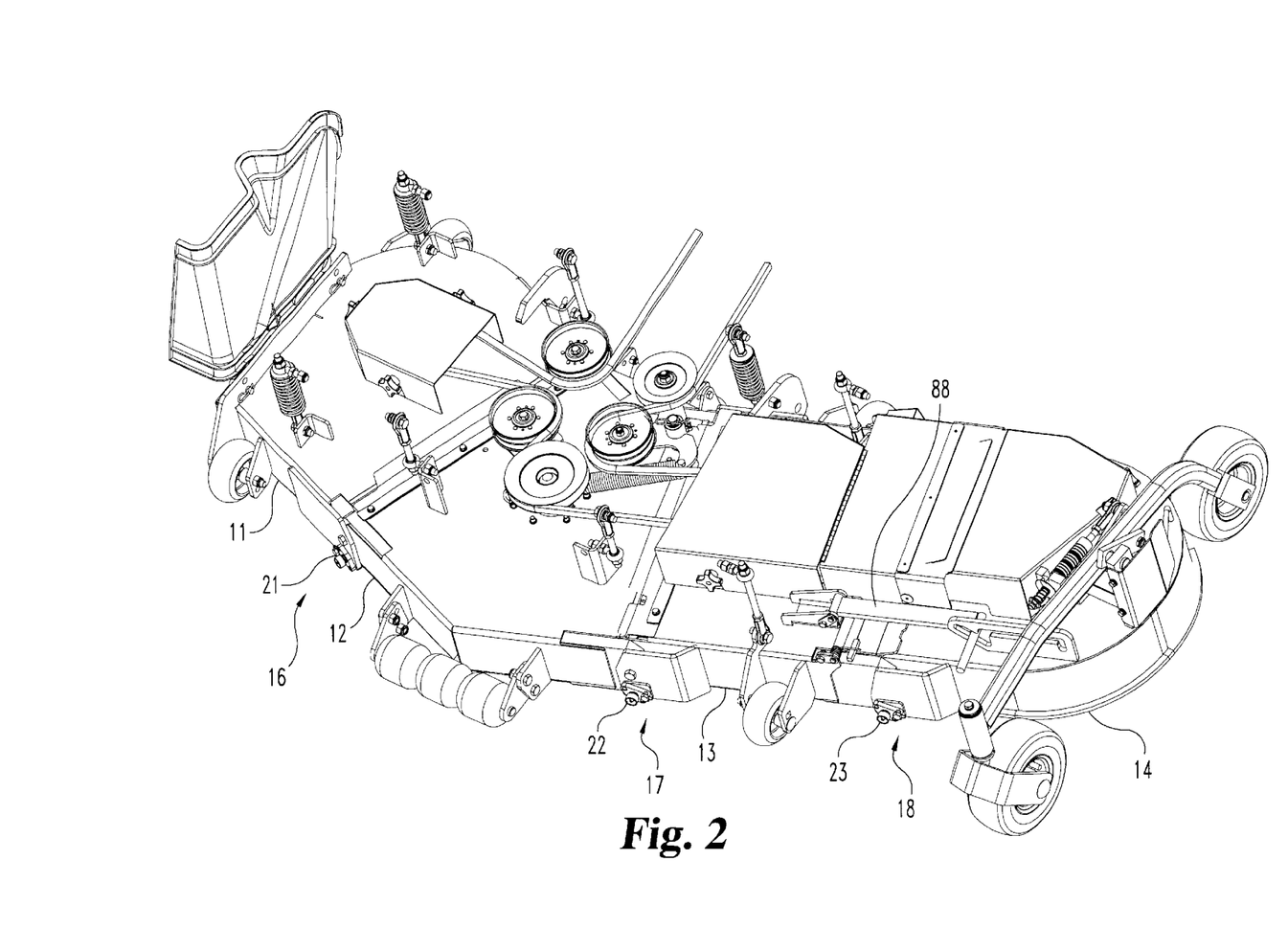
FIG. 2 is a front, perspective view of the mower decks 11–14 of the lawn mower 10 of FIG. 1.
Figure 3:
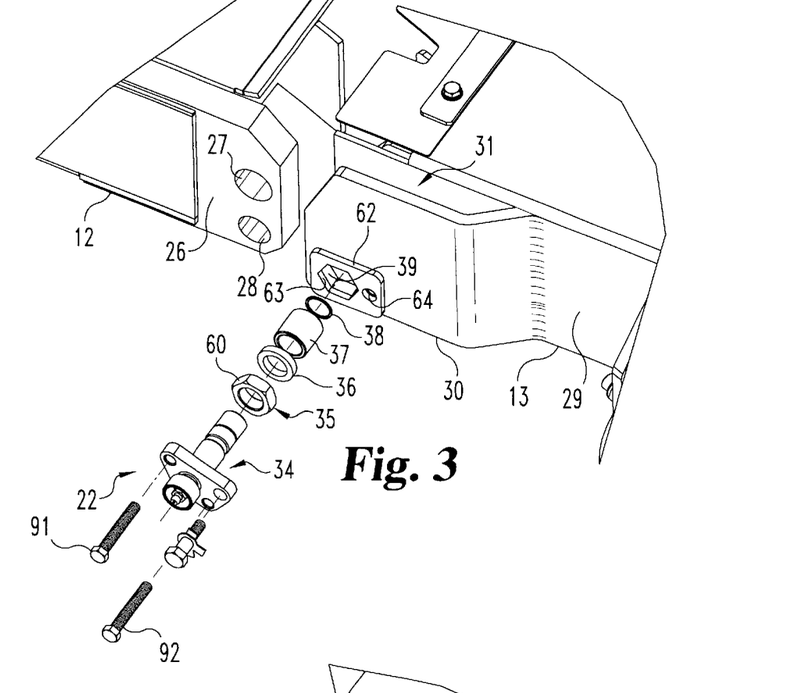
FIG. 3 is an exploded, perspective view of a hinge assembly 22 of the hinge system 17 for hingedly interconnecting decks 12 and 13 of the lawn mower 10 of FIG. 1.
Figure 4:
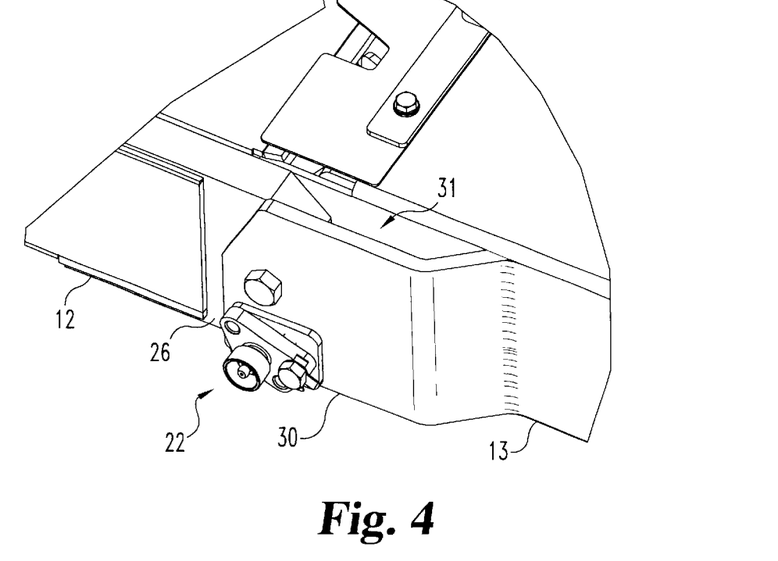
FIG. 4 is a perspective view of the hinge assembly 22 of FIG. 3 and shown in the assembled condition.

Referring to FIGS. 1–3, there is shown a lawn mower 10 having articulating decks 11–14 and hinge systems 16–18 for interconnecting each adjacent pair of mower decks 11–12, 12–13, and 13–14, respectively. Each hinge system 16–18 includes a pair of hinge assemblies operable to allow one deck to pivot about an axis relative to an adjacent deck. Only the forward hinge assemblies 21–23 for each hinge system 16–18, respectively, are shown in FIG. 2, at the front side of the decks. The companion, rear hinge assemblies for each forward hinge assembly 21–23 hingedly interconnect their decks at the opposing, rear and unshown sides of the decks. Only one hinge assembly 22 will be described herein, it being understood that the other two forward hinge assemblies 21 and 23 and the three rear, unshown companion hinge assemblies each includes the same components and each interconnects its pair of decks in the same manner as hinge assembly 22, except where otherwise indicated.

Referring to FIGS. 3–7, the outer frame of central deck 12 extends laterally at frame extension 26 toward deck 11. Frame extension 26 (a frame member of deck 12) has defined therein an upper, limit hole 27 and a lower, hinge hole 28. Deck 13 includes a forward frame panel 29 and an angle bracket 30 that is fixed to panel 29 by any appropriate means such as welding. Panel 29 and bracket 30 (both frame members of deck 13) together define a slot 31 into which frame extension 26 is received when decks 12 and 13 are brought together.

Hinge assembly 22 includes a pin assembly 34, an anti-rotation bushing 35, a spacer 36, a main bushing 37, a retention ring 38, and a shaped hole 39 that is defined in bracket 30. Pin assembly 34 (FIG. 6) includes a hinge pin 42 and a pin mount 43 that is fixedly connected to pin 42 by any appropriate means such as welding. In alternative embodiments, mount 43 may be removably connected to pin 42 by any appropriate means such as threading. Pin 42 is generally a rod made of die hardened chrome to reduce wear, but other compositions of pin 42 are contemplated. Pin 42 has defined therein three circumferential recesses 44, 45 and 46. Recess 44 is actually a circumferential weldment groove 44 located near the outboard end 48 of pin 42. Weldment applied at the juncture of pin mount 43 and pin 42 at groove 44 lodges partially within groove 44, which provides a stronger bond between pin 42 and mount 43, especially as mount 43 is pulled away from the decks, as will be described herein. The outboard end 48 includes the outermost face or surface of pin 42 (as directly indicated at 48 in FIG. 6) as well as a portion of pin 42 proximal the outermost face or surface of pin 42. Opposite outboard end 48 is inboard end 49, which likewise includes not only the innermost surface or face (as directly indicated at 49), but also a portion of pin 42 proximal the innermost surface or face of pin 42.

Figure 6:
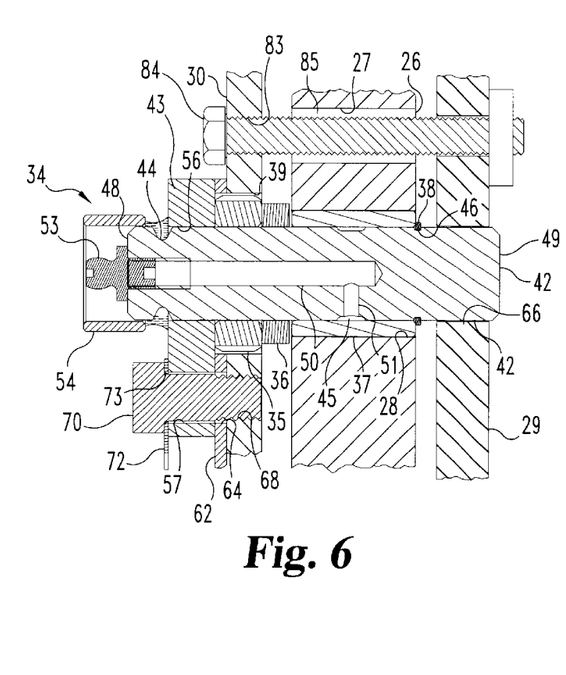
FIG. 6 is a side, cross-sectional view of the hinge assembly 22 of FIG. 5 taken along the lines 6—6 and viewed in the direction of the arrows.

Recesses 45 and 46 are located closer to the inboard end 49, as shown in FIG. 6. Recess 45 is actually an annular grease channel 45, and recess 46 is actually a circumferential retention pin slot 46. A central passageway 50 is defined to extend from outboard end 48 and approximately to channel 45 where a radial passageway 51 extends to provide fluid communication between central passageway 50 and channel 45. A grease fitting 53 is secured to outboard end 48 and in communication with central passageway 50 to permit the injection of grease from fitting 53 to channel 45. A cylindrical collar 54 is secured to the end of pin 42 by any appropriate means, such as welding, to protect grease fitting 53 from debris and damage.

Pin mount 43 includes a central opening 56 a bolt mounting hole 57, and a pair of opposing, threaded thrust holes 58 and 59. Main bushing 37 is made of oil impregnated powdered metal and is sized externally for a press fit into hinge hole 28. The internal diameter of bushing 37 is set to be just slightly larger than the outer diameter of pin 42 to permit pin 42 to rotate freely within bushing 37. The axial length of bushing 37 is substantially equal to the thickness of frame extension 26, as shown in FIG. 6.

Like main bushing 37, anti-rotation bushing 35 has an inner diameter that is just slightly larger than the outer diameter of pin 42 so that pin 42 may rotate freely within bushing 35. However, in assembly as shown in FIG. 6 and during operation, both pin 42 and bushing 35 are constrained from rotating relative to angle bracket 30, and consequently, pin 42 does not rotate relative to bushing 35. That is, similar to a standard nut, the outer surface 60 of anti-rotation bushing 35 is hexagonally shaped. Shaped hole 39 is likewise hexagonally sized and shaped to snugly and matingly receive anti-rotation bushing 35 whereby bushing 35 is prevented from rotating relative to bracket 30 while it disposed within hole 39. Anti-rotation bushing 35 has an axial length that is either equal to or greater than the thickness of angle bracket 30. In the embodiment shown in FIGS. 1–6, the axial length of anti-rotation bushing 35 is greater than the thickness of angle bracket 30 to accommodate a spacer plate 62 that is interposed between pin mount 43 and angle bracket 30. Spacer plate 62 has a shaped hole 63 that is identically sized and shaped to align with shaped hole 39 and to likewise snugly and matingly receive anti-rotation bushing 35. Spacer plate 62 also defines a bolt mounting hole 64 that will align with bolt mounting hole 57 of pin mount 43 when shaped holes 39 and 63 are aligned, as shown in FIGS. 3 and 6. The axial length of anti-rotation bushing 35 is equal to the combined thickness of angle bracket 30 and spacer plate 62. If no spacer plate 62 is not used, then the axial length of anti-rotation bushing 35 will be substantially equal to the thickness of angle bracket 30.

In the assembled condition shown in FIG. 6, spacer 36 is a ring that surrounds pin 42 between anti-rotation bushing 35 and main bushing 37. Spacer 36 has an axial length designed to position main bushing 37 in the proper position along pin 42 whereby, when frame extension 26 is properly positioned within slot 31 of deck 11, anti-rotation bushing 35 and main bushing 37 will both be properly aligned within their respective openings (63 and 39 and 28), as shown in FIG. 6. Retention ring 38 is secured within retention ring slot 46 to limit the inward movement of main bushing 37 beyond slot 46. Retention ring 38 is a coil retention ring and permits slight radial expansion and assembly onto pin 42. Alternatively, retention ring 38 may comprise other configurations or structure, such as a C-clip, so long as it may be applied to and/or used with pin 42 to limit the inward movement of main bushing 37 beyond the desired point. Frame panel 29 defines a hole 66 that is aligned with shaped hole 39 of angle bracket 30 so that when pin assembly 34 is inserted, the inboard end 49 of pin 42 will pass through hole 66 for support.

In assembly, anti-rotation bushing 35, spacer 36 and main bushing 37 are telescopically positioned onto pin 42, up against the inward surface of pin mount 43 and in the order shown. Retention ring 46 is secured in retention ring slot 46 to hold bushing 35, spacer 36 and bushing 37 in position. With decks 10 and 11 positioned to properly position frame extension 26 within slot 31 so that shaped hole 39 axially aligns with hinge hole 28, the inboard end of pin assembly 34 is inserted through the aligned holes 63, 39 and 28 until main bushing 37 reaches hinge hole 28. Because hole 28 and bushing 37 are sized for a press fit, bushing 37 will not easily enter hole 28, and additional force such as by a mallet must be applied to the outboard side of pin assembly 34. After several blows have been applied, main bushing 37 will have been forced into hinge hole 28. As pin assembly is being struck and bushing 37 is forcibly moved into hinge hole 28, anti-rotation bushing 35 will approach shaped holes 63 and 39. The assembler will manually rotate anti-rotation bushing 35, as necessary, at the start of entry of bushing 35 into its mating, shaped hole 63 (or at the start of entry into shaped hole 39 if spacer plate 62 is not included). Thereafter, anti-rotation bushing 35 will slide easily into shaped holes 63 and 39. Likewise, as pin assembly 34 advances into holes 63, 39 and 28, the assembler will rotate pin mount 43, as necessary, to align bolt mounting hole 57 with mating, bolt mounting hole 64 and threaded bolt mounting hole 68 (or just mating threaded bolt mounting hole 68 if spacer plate 62 is not present). A bolt 70 is inserted through a bolt locking tab 72 and then through holes 57 and 64 and then threadedly through hole 68 until tight.

Figures 5, 7:
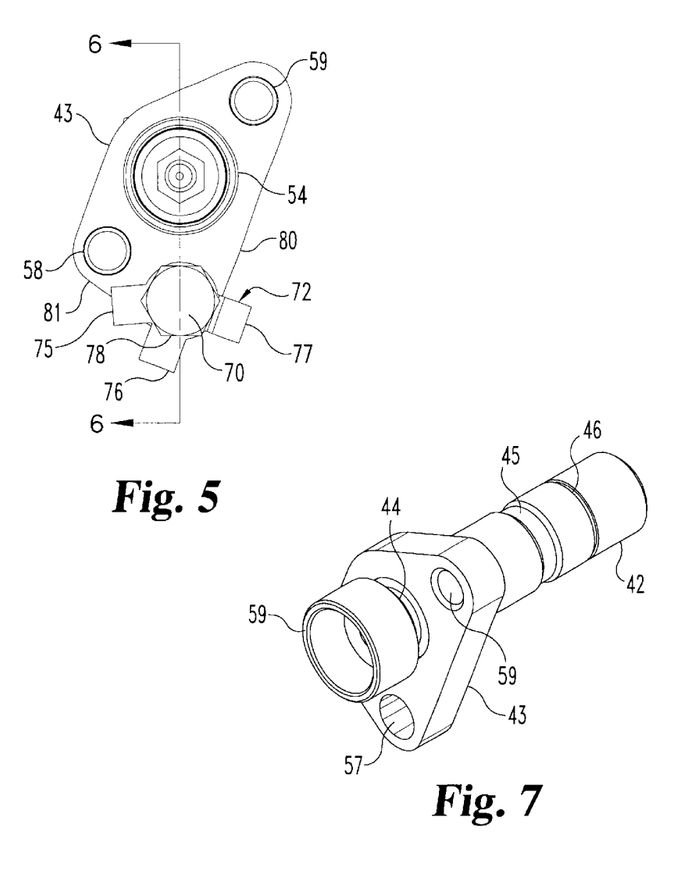
FIG. 5 is an end view of the hinge assembly 22 of FIG. 4.
FIG. 7 is a perspective view of the pin assembly 34 of FIG. 6.

Bolt locking tab 72 is a flat metal member with a central hole 73 for receiving bolt 70. Extending radially outward from hole 73 are a plurality of bendable tabs. In the embodiment of FIG. 5, there are three tabs 75–77, and the angle formed between two adjacent tabs is not equal to the angle formed between a different two adjacent tabs. For example, tabs 76 and 77 are about 90° apart, while the angle formed between tabs 75 and 76 is about 65°. When bolt 70 is tightened as desired, tab 77 is bent down and flat against flat side edge 80 of pin mount 43, and at least one of the tabs 75 and 76 should be in a position to bend up and flat against one of the six side faces of hexagonal bolt head 78. If one of the tabs 75 and 76 is not sufficiently aligned with one of the six side edges, then bolt 70 need be backed out or tightened no more than about 30° to align one of tabs 75 and 76 with a side edge of hexagonal head 78.

With the tabs bent as described, bolt 70 is held firmly in place and restrained from backing out. Alternative elements may be employed to restrain or lock bolt 70 from backing out, including but not limited to lock washers, Loctite adhesive, and a wire retainer tied through a hole in the head of the bolt. Whatever element is used, it should be able to hold the bolt in place, preferably until it is intentionally and manually removed, despite the often severe vibration to which it is subjected from the mower action. Alternative elements are contemplated to connect pin mount 43 to the mower frame member including, but not limited to, one or more screws, clamps, clips, hasps or other mechanical configurations that securely hold pin mount 43 to angle bracket 30 or similar mower frame element, as necessary to hold pin 42 in place for its intended operation, and where such element may be unfastened with little difficulty to release pin mount 43 from its secure connection to the mower frame element. Alternative configurations are contemplated for securely mounting pin 42 to pin mount 43 including, a threaded connection between pin 42 and pin mount 43, an insert and twist key-hole type connection between pin 42 and pin mount 43, alternative elements such as brackets connected separately to both pin 42 and pin mount 43, and any other configuration that securely connects pin 42 with pin mount 43, either permanently or removably.

Eventually, pin 42, one or more of the bushings, other of the hinge assembly elements, or other parts of the mower will require hinge assembly 22 (or one of the other hinge assemblies) to be disassembled. This is accomplished by first bending back the tabs of bolt locking tab 72 and removing bolt 70. Then, a pair of thrust bolts 91 and 92 are inserted into threaded thrust holes 58 and 59 and advanced until their leading ends contact spacerplate 62 (or angle bracket 30 if a thrust plate is not used). Each thrust bolt 91 and 92 is then advanced alternatively a small increment (e.g. a quarter turn). As the leading ends of the thrust bolts bear against spacer plate 62 (or angle bracket 30), pin mount 43 is forcibly backed away from spacer plate 62 and angle bracket 30, which by virtue of retention ring 38, pulls anti-rotation bushing 35 and spacer 36 therewith and, most importantly, pulls main bushing 37 out of its press fit position within hinge hole 28.

Angle bracket 30 defines a threaded hole 83 (FIG. 6) that, when decks 10 and 11 are hingedly connected by pin assembly 34, aligns with limit hole 27 of frame extension 26. A bolt 84 is threadedly received within hole 83 and extends into oversized hole 27. The clearance 85 provided between bolt 84 and hole 27 permits deck 11 to pivot about the axis of pin 42 (and its companion pin, which is not shown, but hingedly connects decks 12 and 13 at the rear side of the decks). The difference in diameter between the shank of bolt 84 and hole 27 defines the degree of articulation (hinged movement) about the corresponding hinge pins 42. This bolt and oversized hole combination that governs the limits of deck articulation is provided at hinge systems 16 and 17, but not at hinge system 18. The limits of articulation between decks 13 and 14 is provided by a deck pivoting system 88 that controls the angle of pivot of deck 14 relative to deck 13, which includes deck 13 pivoting up approximately 90 degrees for a narrower mowing width and for transport.

The present invention has been described as including pin assemblies for hingedly connecting articulating mower decks to one another. Alternative embodiments are contemplated wherein one or more pin assemblies may hingedly connect a mower deck to a portion of the mower that is not a mower deck, but may instead be a section of the mower frame. The present invention shows the shaped hexagonal holes 39 and 63 as being on the angle bracket 30. Alternative embodiments contemplate other shapes of holes 39 (and hole 63 if a spacer plate 62 is used) and include other manners of making bushing 35 non-rotational. For example, alternative embodiments contemplate bushing 35 having a round outer shape and being press fit into its hole to preclude rotation. Other embodiments contemplate bushing 35 being permitted to rotate within its corresponding hole. Other embodiments contemplate the shaped hole 39 being located in the frame extension 26, or in either one of a first mating mower deck and a second mower deck or mower structure. Alternative embodiments are contemplated wherein spacer 36 is replaced by having one or both of bushings 35 and 37 having a greater in axially length or similarly modified in any appropriate manner to achieve the desired spacing among the corresponding components.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. In a mower having articulating mower decks, a hinge assembly for hingedly connecting a first mower frame member defining a first frame hole with a first axis to a second mower frame member defining a second frame hole with a second axis, wherein at least one of the first and second frame members is a frame member of a mower deck of the mower, the hinge assembly comprising:

a first bushing having a first bushing hole and a first bushing axis, being sized for press fit receipt in the first frame hole, and being sized to rotatably coaxially receive a pin therein;

a second bushing having a second bushing hole and a second bushing axis, being sized for axially non-rotating receipt in the second frame hole, and being sized to rotatably coaxially receive a pin therein;

a pin having inboard and outboard ends and a pin axis, said pin sized to extend coaxially through the first and second bushing holes;

a connector connected to the outboard end of said pin and for connecting said pin to the second frame member and holding said pin against horizontal movement relative to the second frame member and for providing a stop for limiting movement of said second bushing toward the outboard end of said pin; and, a retention member connected proximal to the inboard end of said pin and limiting movement of said bushings inwardly of said retention member.

2. The hinge assembly of claim 1 wherein the second frame hole has a non-round shape and wherein said second bushing has an outer non-round shape sized for mating receipt in the non-round shaped second hole.

3. The hinge assembly of claim 2 wherein the second frame hole has a hexagonal shape and wherein said second bushing has an outer hexagonal shape.

4. The hinge assembly of claim 1 wherein said connector includes a pin mount connected to the outboard end of said pin and includes a fastener shaped and configured for secure attachment to the second frame member.

5. The hinge assembly of claim 4 wherein said connector holds said pin against any movement relative to the second frame member.

6. The hinge assembly of claim 4 wherein the pin mount is a plate having an opening in which is securely held the outboard end of said pin.

7. The hinge assembly of claim 6 wherein the pin mount includes at least two thrust holes and the hinge assembly further includes at least one thrust bolt configured for threaded advancement in one of the thrust holes and against the second frame member to pull the pin mount away from the second frame member and said pin and first and second bushings out of the first and second frame holes.

8. The hinge assembly of claim 7 wherein a portion of said pin extends through the opening in the pin mount and outwardly therefrom, and wherein said pin has an outer surface and includes lubricating means for delivering lubricant to a portion of the outer surface of said pin and inside of said first bushing, the lubrication means including a fitting extending outwardly from the outboard end of said pin.

9. The hinge assembly of claim 8 further including a collar connected to the outboard end of said pin and partially shielding the lubrication fitting.

10. The hinge assembly of claim 1 wherein said pin has an outer surface and wherein said retention member includes a groove defined in said pin and includes a retention ring seated in the groove whereby at least a part of the retention ring extends outwardly of the outer surface of said pin.

11. The hinge assembly of claim 10 wherein the retention ring is sufficiently resilient to permit radial expansion and movement over said pin and into the groove.

12. The hinge assembly of claim 1 wherein said pin includes lubrication means to deliver a lubricant from one end of said pin to a space between said pin and said second bushing.

13. The hinge assembly of claim 12 wherein said pin has an outer surface and wherein the lubrication means includes said pin having a channel defined in the outer surface and a passageway defined below the outer surface, the passageway extending from a fitting mounted to one of the inboard and outboard ends to the channel.

14. The hinge assembly of claim 1 further including a spacer disposed between said first and second bushings.

15. In a mower having articulating mower decks, a hinge assembly for hingedly connecting a first mower frame member defining a first frame hole with a first axis to a second mower frame member defining a second frame hole with a second axis, wherein at least one of the first and second frame members is a frame member of a mower deck of the mower, the hinge assembly comprising:
 a first bushing having a first bushing hole and a first bushing axis, being sized for press fit receipt in the first frame hole, and being sized to rotatably coaxially receive a pin therein;
 a second bushing having a second bushing hole and a second bushing axis, being sized for receipt in the second frame hole, and being sized to rotatably coaxially receive a pin therein;
 a pin having inboard and outboard ends and a pin axis, said pin sized to extend coaxially through the first and second bushing holes;
 a connector for connecting said pin to the second frame member and holding said pin against horizontal movement relative to the second frame member and for providing a stop for limiting movement of said second bushing toward the outboard end of said pin; and,
 a retention member connected proximal to the inboard end of said pin and limiting movement of said bushings inwardly of said retention member.

16. In a mower having articulating mower decks, a hinge assembly for hingedly connecting a first mower frame member defining a first hole with a first axis to a second mower frame member defining a second hole with a second axis, wherein at least one of the first and second frame members is a frame member of a mower deck of the mower, the hinge assembly comprising:
 a first bushing having a first bushing hole and a first bushing axis, being sized for press fit receipt in the first frame hole, and being sized to rotatably coaxially receive a pin therein;
 a second bushing having a second bushing hole and a second bushing axis, being sized for axially non-rotating receipt in the second frame hole, and being sized to rotatably coaxially receive a pin therein;
 a pin having inboard and outboard ends and a pin axis, said pin sized to extend coaxially through the first and second bushing holes; and,
 a connector for connecting said pin to the second frame member and holding said pin against horizontal movement relative to the second frame member and for providing a stop for limiting movement of said second bushing toward the outboard end of said pin.

17. A hinge assembly for hingedly connecting a mower deck to a mower frame member, comprising:
 a first mower frame member defining a first frame hole with a first axis;
 a second mower frame member defining a second frame hole with a second axis, wherein at least one of the first and second frame members is a frame member of a mower deck;
 a first bushing having a first bushing hole and a first bushing axis, being tightly but removably received in the first hole, and being sized to rotatably coaxially receive a pin therein;
 a second bushing having a second bushing hole and a second bushing axis, being axially non-rotatingly received in the second hole, and being sized to rotatably coaxially receive a pin therein;
 a pin having inboard and outboard ends and a pin axis and extending coaxially through said first and second bushing holes;
 a connector for connecting said pin to the second frame member and holding said pin against horizontal movement relative to the second frame member and for providing a stop for limiting movement of said second bushing toward the outboard end of said pin; and,
 a retention member connected proximal to the inboard end of said pin and limiting movement of said bushings inwardly of said retention member.

18. The hinge assembly of claim 17 wherein the first mower frame member is a frame member of a first mower deck and wherein the second mower frame member is a frame member of a second mower deck.

19. The hinge assembly of claim 17 wherein the second frame hole has a non-round shape and wherein said second bushing has an outer non-round shape sized for mating receipt in the non-round shaped second frame hole.

20. The hinge assembly of claim 19 wherein the second frame hole has a hexagonal shape and wherein said second bushing has an outer hexagonal shape.

21. The hinge assembly of claim 17 wherein said connector is a pin mount connected to the outboard end of said pin and includes a fastener securely and removably attaching the pin mount to the second frame member.

22. The hinge assembly of claim 21 wherein said connector holds said pin against any movement relative to the second frame member.

23. The hinge assembly of claim 21 wherein the pin mount is a plate having an opening in which is securely held the outboard end of said pin.

24. The hinge assembly of claim 23 wherein the pin mount includes at least two thrust holes and the hinge assembly further includes at least one thrust bolt configured for threaded advancement in one of the thrust holes and against the second frame member to pull the pin mount away from the second mower frame member and said pin and first and second bushings out of the first and second frame holes.

25. The hinge assembly of claim 24 wherein a portion of said pin extends through the opening in the pin mount and outwardly therefrom, and wherein said pin has an outer surface and includes lubricating means for delivering lubricant to a portion of the outer surface of said pin and inside of said first bushing, the lubrication means including a fitting extending outwardly from the outboard end of said pin.

26. The hinge assembly of claim 25 further including a collar connected to the outboard end of said pin and partially shielding the lubrication fitting.

27. The hinge assembly of claim 17 wherein said pin has an outer surface and wherein said retention member includes a groove defined in said pin and includes a retention ring seated in the groove whereby at least a part of the retention ring extends outwardly of the outer surface of said pin.

28. The hinge assembly of claim 27 wherein the retention ring is sufficiently resilient to permit radial expansion and movement over said pin and into the groove.

29. The hinge assembly of claim 17 wherein said pin includes lubrication means to deliver a lubricant from one end of said pin to a space between said pin and said second bushing.

30. The hinge assembly of claim 29 wherein said pin has an outer surface and wherein the lubrication means includes said pin having a channel defined in the outer surface and a passageway defined below the outer surface, the passageway extending from a fitting mounted to one of the inboard and outboard ends to the channel.

31. The hinge assembly of claim 17 further including a spacer disposed between said first and second bushings.

32. The hinge of claim 17 wherein said second mower frame includes a third frame hole coaxially aligned with the second frame hole and sized to supportingly receive the inboard end of said pin therein.

33. The hinge of claim 17 wherein the first mower frame defines a third frame hole with a third axis and the second mower frame defines a fourth frame hole with a fourth axis, wherein the first and second bushing.

34. A method for hingedly connecting a mower deck to a mower frame member, comprising the steps of:
 providing a hinge assembly for hingedly connecting a first mower frame member defining a first frame hole with a first, axis to a second mower frame member defining a second frame hole with a second axis, wherein at least one of the first and second frame members is a frame member of a mower deck of a mower, the hinge assembly including:
  a first bushing having a first bushing hole and a first bushing axis, being sized for press fit receipt in the first frame hole, and being sized to rotatably coaxially receive a pin therein,
  a second bushing having a second bushing hole and a second bushing axis, being sized for axially non-rotating receipt in the second frame hole, and being sized to rotatably coaxially receive a pin therein,
  a pin having inboard and outboard ends and a pin axis, said pin sized to extend coaxially through the first and second bushing holes,
  a connector connected to the outboard end of said pin and for connecting said pin to the second frame member and holding said pin against horizontal movement relative to the second frame member and for providing a stop for limiting movement of said second bushing toward the outboard end of said pin, and
  a retention member for limiting movement of said bushings inwardly of said retention member;
 assembling a hinge assembly by sliding said first and second bushings onto said pin from the inboard end toward the outboard end and against said connector and then connecting said retention member to said pin inwardly of said first and second bushings to restrain said first and second bushings from sliding off the inboard end of said pin;
 inserting the assembled hinge assembly through the first and second frame holes, until said first bushing is tightly positioned in the first frame hole and the second bushing is positioned in the second frame hole; and
 connecting the connector to the second frame member to secure the hinge assembly against horizontal movement relative to the second frame member.

35. The method for hingedly connecting a mower deck to a mower frame member of claim 34 wherein said providing step includes the pin mount of said hinge assembly being a plate having an opening in which is securely held the outboard end of said pin.

36. The method for hingedly connecting a mower deck to a mower, frame member of claim 35 wherein said providing step includes the pin mount having at least two threaded thrust holes and the hinge assembly further including at least one thrust bolt, and wherein the method for hingedly connecting a mower deck to a mower frame member further includes the step of advancing the at least one thrust bolt in each of the thrust holes and against the second frame member until the pin mount is pulled away from the second mower frame member and said pin and first and second bushings are pulled out of the first and second frame holes.

37. A hinge assembly for hingedly connecting a mower deck defining a first hole having a first shape and first dimension to other mower structure defining a second hole having a second shape and second dimension, comprising:
 a pin having an axis and defining a slot;
 a pin mount connected to said pin and defining first and second thrust holes;
 a connector for connecting said pin mount to one of the deck and the structure;
 a first bushing sized and shaped for a press fit receipt in one of the first and second holes and having a first internal dimension sized to receive a portion of said pin;
 a second bushing sized and shaped for receipt in the other of the first and second holes and having a second internal dimension sized to receive a portion of said pin; and;
 a retention member sized and shaped for receipt in the slot to retain said first and second bushings between said pin mount and the slot.

38. A method for hingedly connecting a first mower frame member defining a first frame hole with a first axis to a second mower frame member defining a second frame hole with a second axis, wherein at least one of the first and second frame members is a frame member of a mower deck of a mower, comprising the steps of:
 providing a hinge assembly elements, including:
  a first bushing defining a first bushing hole and a first bushing axis and being sized for press fit receipt in the first frame hole, a second bushing defining a second bushing hole and a second bushing axis and being sized for receipt in the second frame hole, a pin having inboard and outboard ends and a pin axis, said pin sized to extend coaxially through the first and second bushing holes, a pin mount connected to the outboard end of said pin and defining at least two thrust holes, connection means for connecting said pin mount to the second frame member, a retention member;

assembling a hinge assembly by sliding said first and second bushings onto said pin and then connecting said retention member to said pin to trap said first and second bushings between said pin mount and said retention member;

inserting the assembled hinge assembly through the first and the second frame holes, until said first bushing is tightly positioned in the first frame hole and the second bushing is positioned in the second frame hole; and connecting said pin mount to the second frame member with said connection means to secure the hinge assembly against movement relative to the second frame member.

39. A hinge assembly for connecting a first mower frame member defining a first hole with a first axis to a second mower frame member defining a second hole with a second axis, wherein at least one of the first and second frame members is a frame member of a mower deck of the mower, the hinge assembly comprising:

a pin having inboard and outboard ends and a pin axis;

a pin mount connected to the outboard end of said pin and defining at least two thrust holes;

connection means for removably connecting said pin mount to the second frame member;

a first bushing coaxially received over said pin and being sized for press fit receipt in the first frame hole;

a second bushing coaxially received over said pin next to said first bushing and being sized for receipt in the second frame hole; and, a retention member removably connected to the inboard end of said pin trapping said bushings between said pin mount and said retention member.

40. The hinge assembly of claim 39 further including at least one thrust bolt sized and configured for threaded receipt in the thrust holes of said pin mount.

41. The hinge assembly of claim 39 further including holding means for holding said second bushing against rotation relative to the second frame member when said second bushing is received with the second frame hole.

42. The hinge assembly of claim 41 wherein said holding means includes the second frame hole having a non-round shape and said second bushing being sized and configured for complementary, non-rotational fit with the second frame hole.

43. A hinge assembly for connecting a first mower frame member to a second mower frame member, comprising:

a first mower frame member defining a first frame hole with a first axis;

a second mower frame member defining a second frame hole with a second axis, wherein at least one of the first and second frame members is a frame member of a mower deck;

a pin having inboard and outboard ends and a pin axis;

a pin mount connected to the outboard end of said pin and defining at least two thrust holes;

a first bushing coaxially received over said pin and being coaxially press fit received in the first frame hole;

a second bushing coaxially received over said pin next to said first bushing and being coaxially positioned in the second frame hole;

a retention member removably connected to the inboard end of said pin trapping said bushings between said pin mount and said retention member; and, connection means removably connecting said pin mount to the second frame member.

44. The hinge assembly of claim 43 further including at least one thrust bolt sized and configured for threaded receipt in the thrust holes of said pin mount.

45. The hinge assembly of claim 43 further including holding means for holding said second bushing against rotation relative to the second frame member.

46. The hinge assembly of claim 45 wherein said holding means includes the second frame hole having a non-round shape and said second bushing being sized and configured for complementary, non-rotational fit with the second frame hole.

\* \* \* \* \*